(12) United States Patent
Choi et al.

(10) Patent No.: US 7,652,089 B2
(45) Date of Patent: Jan. 26, 2010

(54) NANOCOMPOSITE, NANOCOMPOSITE ELECTROLYTE MEMBRANE AND FUEL USING THE SAME

(75) Inventors: Yeong Suk Choi, Suwon-si (KR); Hae Kyung Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 301 days.

(21) Appl. No.: 11/445,334

(22) Filed: Jun. 2, 2006

(65) Prior Publication Data

US 2007/0072982 A1      Mar. 29, 2007

(30) Foreign Application Priority Data

Sep. 24, 2005   (KR) .................... 10-2005-0089027

(51) Int. Cl.
  *C08K 9/04*   (2006.01)
  *C08G 75/02*  (2006.01)
  *H01M 8/00*   (2006.01)

(52) U.S. Cl. ..................... 524/445; 524/609; 429/12

(58) Field of Classification Search ................ 524/445, 524/609; 429/12
    See application file for complete search history.

(56) References Cited

U.S. PATENT DOCUMENTS

2002/0094466 A1* 7/2002 Kerres et al. ................ 429/33
2005/0084728 A1* 4/2005 Kim et al. ................... 429/33

FOREIGN PATENT DOCUMENTS

| JP | 10-21943 | 1/1998 |
|---|---|---|
| JP | 2000-290505 | 10/2000 |
| JP | 2002-504603 | 2/2002 |
| JP | 2002-203577 | 7/2002 |
| JP | 2003-501516 | 1/2003 |
| JP | 2003-272439 | 9/2003 |
| JP | 2003-277610 | 10/2003 |
| JP | 2004-509224 | 3/2004 |
| JP | 2005-79099 | 5/2005 |
| JP | 2005-166384 | 6/2005 |
| JP | 2006-31970 | 2/2006 |
| KR | 2005-22744 | 3/2005 |
| WO | WO 99/43731 | 9/1999 |

OTHER PUBLICATIONS

Office Action issued by Japanese Patent Office in Japanese Patent Application No. 2006-155441 on Jul. 22, 2008.
Office Action issued in Korean Patent Application No. 2005-89027 on Oct. 4, 2005.

* cited by examiner

*Primary Examiner*—Kriellion A Sanders
(74) *Attorney, Agent, or Firm*—Stein McEwen, LLP

(57) ABSTRACT

A nanocomposite including: a sulfonated polysulfone and a nonmodified clay dispersed in the sulfonated polysulfone, the nonmodified clay having a layered structure, and the nonmodified clay being intercalated with the sulfonated polysulfone, or the layers of the layered structure being exfoliated, a nanocomposite electrolyte membrane and a fuel cell using the same. In the nanocomposite, a nanoscale amount of the nonmodified clay, which has a layered structure, is dispersed in sulfonated polysulfone having excellent ionic conductivity. Thus, the nanocomposite has excellent ionic conductivity and mechanical properties. The nanocomposite electrolyte membrane formed using this nanocomposite has an improved ability to suppress permeation of polar organic fuels, such as methanol, while maintaining appropriate ionic conductivity. In addition, the fuel cell with the nanocomposite electrolyte membrane can effectively prevent crossover of methanol used as a fuel, thereby providing improved working efficiency and an extended lifespan.

21 Claims, 9 Drawing Sheets

FIG. 3
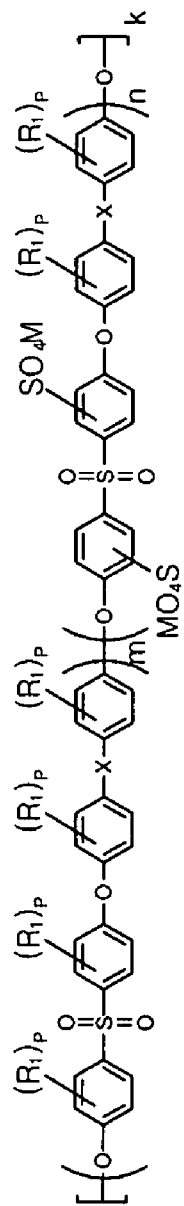
FORMULA 1
CLAY ADDED
MIX AND STIR POLYMER AND CLAY DISPERSED SOLUTION
INTERCALATION TYPE

NANOCOMPOSITE, NANOCOMPOSITE ELECTROLYTE MEMBRANE AND FUEL USING THE SAME

CROSS-REFERENCE TO RELATED PATENT APPLICATIONS

This application claims the benefit of Korean Application No. 2005-89027, filed Sep. 24, 2005, in the Korean Intellectual Property Office, the disclosure of which is incorporated herein by reference.

BACKGROUND OF THE INVENTION

1. Field of the Invention

Aspects of the present invention relate to a nanocomposite, a nanocomposite electrolyte membrane, and a fuel cell using the same, and more particularly, to a sulfonated polysulfone/clay nanocomposite having good thermal resistance and ionic conductivity, a nanocomposite electrolyte membrane including the same, and a fuel cell using the nanocomposite electrolyte membrane.

2. Description of the Related Art

Conventional fuel cells can be classified into polymer electrolyte membrane (PEM) cells, phosphoric acid cells, molten carbonate cells, solid oxide cells, and the like. The operating temperature of fuel cells and constituent materials thereof are dependent on the type of electrolyte used in a cell.

When a nanoscale amount of clay is dispersed in a polymer, excellent properties such as dimensional stability, thermal resistance, mechanical strength, and barrier performance are shown and which the current existing composites do not display. Accordingly, technologies of forming clay into composites using polymers are disclosed in Japanese Patent Laid-Open Publications Nos. 2000-290505 and 2003-277610. However, if composites are formed with clay, monomer purity with high condensation polymerization, monomer reactivity control, dehydration, and temperature control are required and thus, a polymer with high molecular weight is not easily obtained.

SUMMARY OF THE INVENTION

Aspects of the present invention provide a nanocomposite having improved mechanical strength, thermal resistance, and ionic conductivity by using a large molecular weight polymer produced by the addition of clay and a nanocomposite electrolyte membrane using the same.

Aspects of the present invention also provide a fuel cell having improved fuel efficiency and energy density by using the nanocomposite electrolyte membrane described above.

According to an aspect of the present invention, there is provided a nanocomposite including: a sulfonated polysulfone and a nonmodified clay dispersed in the sulfonated polysulfone, the nonmodified clay having a layered structure, and the nonmodified clay being intercalated with the sulfonated polysulfone, or the layers of the layered structure being exfoliated.

According to another aspect of the present invention, there is provided a method of manufacturing a nanocomposite including: mixing nonmodified clay, a first polymerized monomer for forming sulfonated polysulfone, a second polymerized monomer for forming sulfonated polysulfone, and a diol compound to perform a polymerization reaction after a heat treatment.

According to another aspect of the present invention, there is provided a method of manufacturing a nanocomposite including: mixing a first polymerized monomer for forming sulfonated polysulfone, a second polymerized monomer for forming sulfonated polysulfone, and a diol compound to perform a condensation polymerization reaction after heat treatment; and adding nonmodified clay to the reacted resultant from the condensation polymerization reaction and mixing.

According to another aspect of the present invention, there is provided a method of manufacturing a nanocomposite including: dissolving sulfonated polysulfone with a solvent to prepare a sulfonated polysulfone solution; dispersing clay with a dispersion medium to prepare a clay dispersed solution; and mixing the sulfonated polysulfone solution and the clay dispersed solution.

According to another aspect of the present invention, there is provided a nanocomposite electrolyte membrane including a nanocomposite described above.

According to another aspect of the present invention, there is provided a fuel cell including a cathode, an anode, and an electrolyte membrane interposed between the cathode and the anode, the electrolyte membrane being a nanocomposite electrolyte membrane containing the nanocomposite described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a view for explaining a third method of preparing a nanocomposite according to another embodiment of the present invention;

DETAILED DESCRIPTION OF THE EMBODIMENTS

Figure 1:
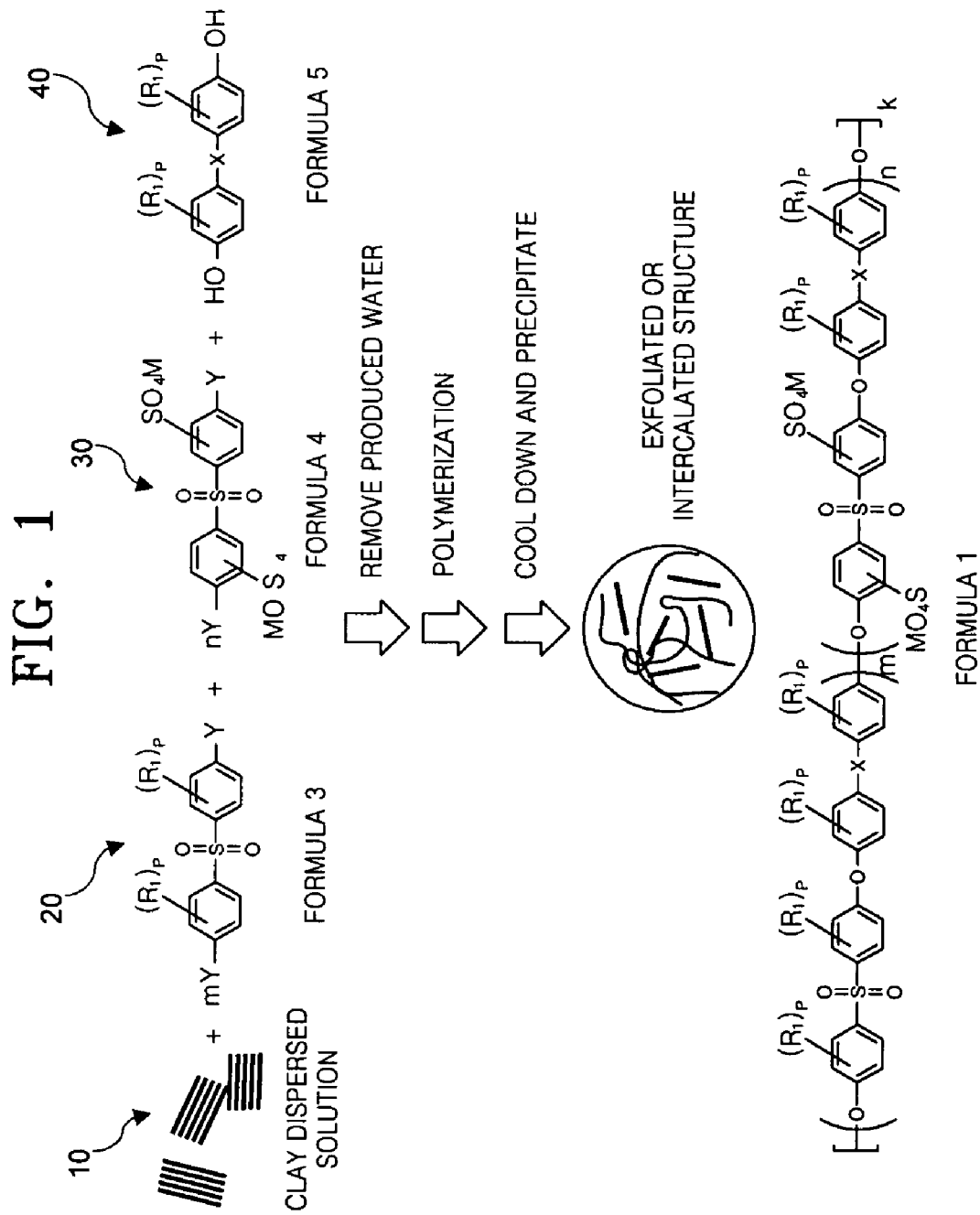
FIG. 1 is a view for explaining a first method of preparing a nanocomposite according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A nanocomposite, according to an aspect of the present invention, includes sulfonated polysulfone and nonmodified clay dispersed in the sulfonated polysulfone.

The term nonmodified clay refers to a silicate having a characteristic that an interlayer space is expanded by polar solvents such as water or an intercalant, and has a simpler and more cost-effective manufacturing process than denatured clay reformed to organic phosphonium and the like. Also, the nonmodified clay (hereinafter clay or nonmodified clay) has a better distinguishing chemical attraction to water than to methanol, so when the clay is dispersed in a form of exfoliation or intercalation inside a membrane, even when only a nanoscale amount of the clay is used, a decrease of conductivity of the membrane caused by supplementary inorganic materials due to absorption of clay is minimized, through suppressing crossover of methanol.

While not required in all aspects, an amount of the clay is 0.1-50 parts by weight based on 100 parts by weight of the nanocomposite. Generally, when the amount of the clay is below this range, barrier performance of the clay cannot be expected. Generally, when the amount of the clay is above this range, the viscosity of the nanocomposite is increased and the nanocomposite becomes brittle.

Examples of the nonmodified clay used in the present invention include smectite-based clay. Specific examples of the smectite-based clay include montmorillonite, bentonite, saponite, beidellite, nontronite, hectorite, stevensite, and the like.

In the nanocomposite according to an aspect of the present invention, the clay having a layered structure is not only dispersed uniformly in sulfonated polysulfone, but also the sulfonated polysulfone is intercalated in the interlayers of the clay. While not required in all aspects, in some cases, the interlayer space of each layer is increased and in other cases increased to the point where each layer may exist in an exfoliated form.

The nanocomposite, according to an aspect of the present invention, wherein each layer of the clay having the layered structure is dispersed in the polymer in the form of intercalation or exfoliation by sulfonated polysulfone with good ionic conductivity, has excellent mechanical strength, thermal resistance, and ionic conductivity. Moreover, once such a nanocomposite soaks up water, permeation by a polar organic fuel such as methanol and/or ethanol is suppressed. Therefore, the nanocomposite can effectively suppress crossover of polar organic fuels and can be effectively used in constituent materials of an electrolyte membrane of a fuel cell which directly supplies polar organic fuels to an anode.

The above-described sulfonated polysulfone can be a compound represented by formula 1:

[Formula 1]

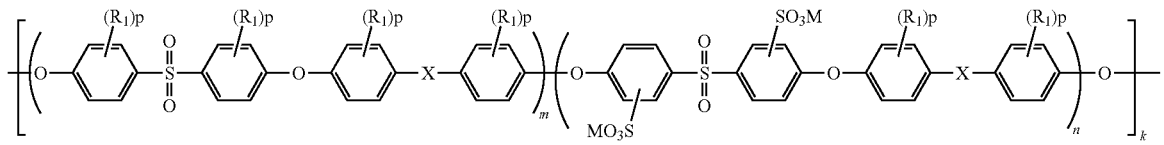

where $R_1$ can be the same or different and is a C1-C10 alkyl group, a C2-C10 alkenyl group, a phenyl group or a nitro group, p is an integer of 0-4, X is —$C(CF_3)_2$—, —$C(CH_3)_2$— or —$P(=O)Y'$— ($Y'$ is H or $C_6H_5$), M is Na, K, or H, m is 0.1-10, n is 0.1-10, and k is 5-500.

In the above formula 1, the ratio of m and n is the mixed ratio of a sulfonated polysulfone repeating unit having no $SO_3M$ group and the sulfonated polysulfone repeating unit having a $SO_3M$ group, respectively. According to the mixed ratio, the characteristics of the sulfonated polysulfone represented by formula 1 such as ionic conductivity differ greatly. For excellent ionic conductivity, m is preferably 0.1-4 and n is 0.1-4.

In formula 1, when p is 0, $(R_1)_p$ refers to hydrogen.

While not required in all aspects, the above formula 1 can be a compound represented by formula 2:

[Formula 2]

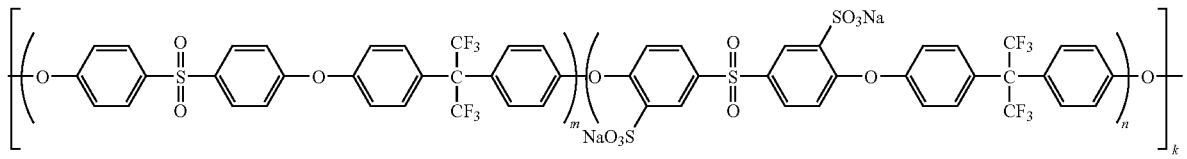

where, m is 0.1-4, n is 0.1-4, and k is 5-500.

The above compound represented by formula 2 has S=O and S—O groups forming strong attractive forces with a clay. In such a compound, attractive interaction between clay layers and a polymer of the compound is sufficient for bonding, however, additionally, a bonding interaction with the clay which is disposed at ends of the polymer molecules increases since functional groups exist at the ends of the molecules.

Also, each end portion of the sulfonated polysulfone represented by formula 1, is endcapped using one or more compounds selected from the group consisting of an amino group which forms a strong attractive force with the clay by an exchange reaction with a cation (Na, K, and etc., here, Na) included in the interlayer of the clay and a functional group which forms an attractive interaction between a surface of the clay by wan der Vaals, polarity, and/or ionically (for example, benzene, sulfate, carbonyl group, and amide group), so as to establish a bonding structure interacting with the clay (substitution included).

Examples of the endcap which act as a clay modifier include: 2-acetamidophenol, 3-acetamidophenol, 2,6-di-tert-butyl-4-methylphenol, 3-ethylphenol, 2-amino-4-chlorophenol, 6-amino-2,4-dichloro-3-methylphenol, 4-amino-3-methylphenol, 2-amino-3-nitrophenol, 2-aminophenol, 2-sec-butylphenol, 3-aminophenol, 3-diethylaminophenol, 4,4'-sulfonyldiphenol, 2-methyl-3-nitrophenyl, 3-tert-butylphenol, 2,3-dimethoxyphenol, 4-amino-2,5-dimethylphenol, 2,6-dimethyl-4-nitrophenol, 4-sec-butylphenol, 4-isopropylphenol, 2-amino-4-tert-butylphenol, 2-tertbutyl-4-methylphenol, 4-tert-butyl-2-methylphenol, 4-tert-butylphenol, 2-amino-5-nitrophenol, 5-isopropyl-3-methylphenol, 4-(methylamino)phenol sulfate, 3-methoxyphenol, 3,5-dimethylthiophenol, 3,5-dimethylphenol, 2-aminophenol, 4-aminophenol, 3-(N,N'-diethylamino)-phenol, 2,6-dimethoxyphenol, 4-acetaminophenol, 2-amino-4-methylphenol, 2,5-dimethylphenol, 2-ethylphenol, 4-ethylphenol, and a mixture thereof.

The nanocomposites according to aspects of the present invention can be prepared using at least 3 methods as described below, however aspects of the invention are not limited thereto.

According to an embodiment of the present invention, in a first method a dehydrated nonmodified clay is mixed with a first polymerized monomer for forming sulfonated polysulfone (hereinafter, referred to as "the first polymerized monomer"), a second polymerized monomer for forming sulfonated polysulfone (hereinafter, referred to as "the second polymerized monomer"), and diol compounds (hereinafter, referred to as "the third polymerized monomer" or diol compounds) and an in-situ polymerization reaction is performed.

According to another embodiment of the present invention, in a second method, after the first polymerized monomer, the second polymerized monomer, and the diol compounds are mixed and the polymerization reaction is performed, the dehydrated nonmodified clay is added at the end of polymerization.

According to another embodiment of the present invention, in a third method, after sulfonated polysulfone is obtained by mixing the first polymerized monomer, the second polymerized monomer, and the diol compounds and performing the polymerization reaction, a sulfonated polysulfone solution is obtained by dissolving the resultant with a solvent and adding a clay dispersed solution dispersing nonmodified clay with a solvent to the sulfonated polysulfone solution. The combined sulfonated polysulfone solution and the clay dispersed solution are stirred.

Hereinafter, referring to FIGS. 1 through 3, the above-described methods will be described more fully. FIG. 1 is a view for explaining the first method of preparing a nanocomposite according to an embodiment of the present invention. Referring to FIG. 1, after nonmodified clay is dehydrated, the resultant is dispersed with a dispersion medium and a clay dispersed solution 10 is obtained. The clay dispersed solution 10 is mixed with the first polymerized monomer 20 represented by formula 3, the second polymerized monomer 30 represented by formula 4, the diol compounds 40 represented by formula 5, a solvent and a base. Here, as the dispersion medium, N-methylpyrrolidone, dimethylacetamide, dimethylformamide, dimethylsulfoxide, and others are used and the amount of the dispersion medium is preferably 50-1000 parts by weight based on 100 parts by weight of the clay as clay is uniformly dispersed in this range.

[Formula 3]

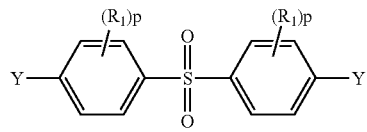

where, $R_1$ and p are defined as in formula 1 and Y is Cl, F, Br, or I.

[Formula 4]

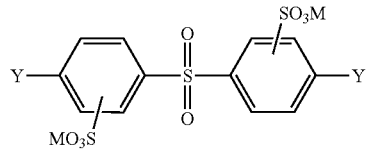

where, M is defined as in formula 1 and Y is Cl, F, Br, or I.

[Formula 5]

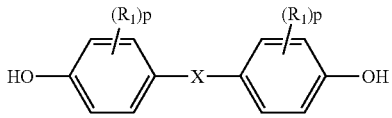

where, $R_1$, X and p are defined as in formula 1.

For the first polymerized monomer 20, as shown in FIG. 1, compounds such as 4,4'-difluorobenzophenone, 4,4'-dichlorobenzophenone, 1,3-dichlorobenzene, 1,3-difluorobenzene, and other compounds can also be used in addition to the compounds described by formula 3. Such compounds and the polymerized monomers 20, 30, 40 are mixed and reacted to obtain a desired polysulfone.

For the solvents in the first method, toluene, benzene, xylene, and others are used and the amounts may be 50-500 parts by weight based on 100 parts by weight of the total weight of the first polymerized monomer 20 (acyl halides), the second polymerized monomer 30 (sulfated acyl halides), and the third polymerized monomer 40 (the diol compounds).

For the base in the first method, potassium carbonate ($K_2CO_3$) or sodium carbonate ($Na_2CO_3$) is used and the amount is 0.5-3 moles based on 1 mole of the third polymerized monomer 40.

Prior to using, the clay is washed as follows:

In order to remove impurities included in the clay, distilled water is added to the clay in a container and ball milling is performed for 3 days or more at 100 rpm. Then, after ball milling, the clay is centrifugally separated and washed with triple distilled water. The ball milled and centrifugally separated clay is re-dispersed and washed with triple distilled water after being centrifugally separated. The washed clay (for 3 times or more) is heat dried or lyophilized (freeze-dried), and then is kept in the form of powder by grinding the dried clay.

When dehydrating the nonmodified clay, heating for 5 hours or more at 10° C. at atmospheric pressure (about 760 mmHg) and heating for 4 hours or more at 60° C. or above under a reduced pressure are used and the amount of the clay is 0.1-50 parts by weight based on 100 parts by weight of the nanocomposite or the total weight of monomer. Here, the total weight of monomer refers to the total weight of the first polymerized monomer 20 in formula 3, the second polymerized monomer 30 in formula 4, and the diol compounds 40 in formula 5. Generally, when the amount of the clay is below 0.1 parts by weight, the barrier performance of the clay cannot be expected. Generally, when the amount of the clay is above 50 parts by weight, the viscosity of the nanocomposite is increased and the nanocomposite becomes brittle.

Examples of the first polymerized monomer 20 include 4,4'-dichlorodiphenyl sulfone (DCDPS), 4,4'-difluorine-diphenyl sulfone and the like. Examples of the second polymerized monomer 30 include sulfated-4,4'-dichlorodiphenyl sulfone (S-DCDPS) and the like.

Examples of the diol compounds 40 include 4,4'-(hexafluoroisopropylidene)diphenol (HFIPDP), 4,4'-sulfonyldiphenol, 4,4'-isopropylidenediphenol, 4,4'-thiodiphenol, 3,3'-(ethylenedioxy)diphenol, 4,4'-(9-fluorenylidene)diphenol, 4,4'-(1,3-adamantanediyl)diphenol, bisphenol-A, 4,4'-hexafluoroisopropylidene, and the like.

A polymerization temperature enables water generated in a nucleophilic reaction to be removed under reflux with toluene. A first operation at 100-180° C., preferably 120-160° C., and a second operation at 140-195° C., preferably 160-180° C., are sequentially performed. After the reflux at 140° C. for 4 hours, polymerization is performed at 160° C. for 4 hours and then at 180° C. for 4 hours.

In the above-described first operation, a precursor for forming polysulfone is formed after removing the generated water and in the second operation, viscosity is increased as polymerization progresses.

Then, the mixture is heat treated and a polymerization reaction is performed. After cooling down the resultant, the nanocomposites can be obtained using a work-up process precipitating the resultant in ethanol or distilled water.

An amount of the second polymerized monomer 30 (for example, a sulfonated dihalide) may be 0.1-3 moles based on 1 mole of the first polymerized monomer 20 (for example, a dihalide). Generally, when the amount is below this range, ionic conductivity is low. Generally, when the amount is above this range, swelling is excessively raised by water in a resultant polymer and thus, a membrane is hardly formed.

An amount of the diol compounds 40 may be 0.7-1.3 moles based on 1 mole of total moles of the first polymerized monomer 20 and the second polymerized monomer 30. Generally, when the amount of the diol compounds 40 is above or below this range, it is not preferable in the polymerization reaction.

In the above process, a clay modifier having one or more groups selected from an amino group and a methyl group may be added to the mixture of the first polymerized monomer 20 and the second polymerized monomer 30 to bond nonmodified clay at end portions of sulfonated polysulfone.

An amount of the compound having one or more groups selected from the amino group and the methyl group may be 0.001-0.5 moles based on 1 mole of total moles of the first polymerized monomer 20 in formula 3, the second polymerized monomer 30 in formula 4, and the diol compounds 40 in formula 5.

Generally, when the amount is below this range, the probability of contact with the clay is small. When the amount is above this range, molecular weight does not increase.

Figure 2:
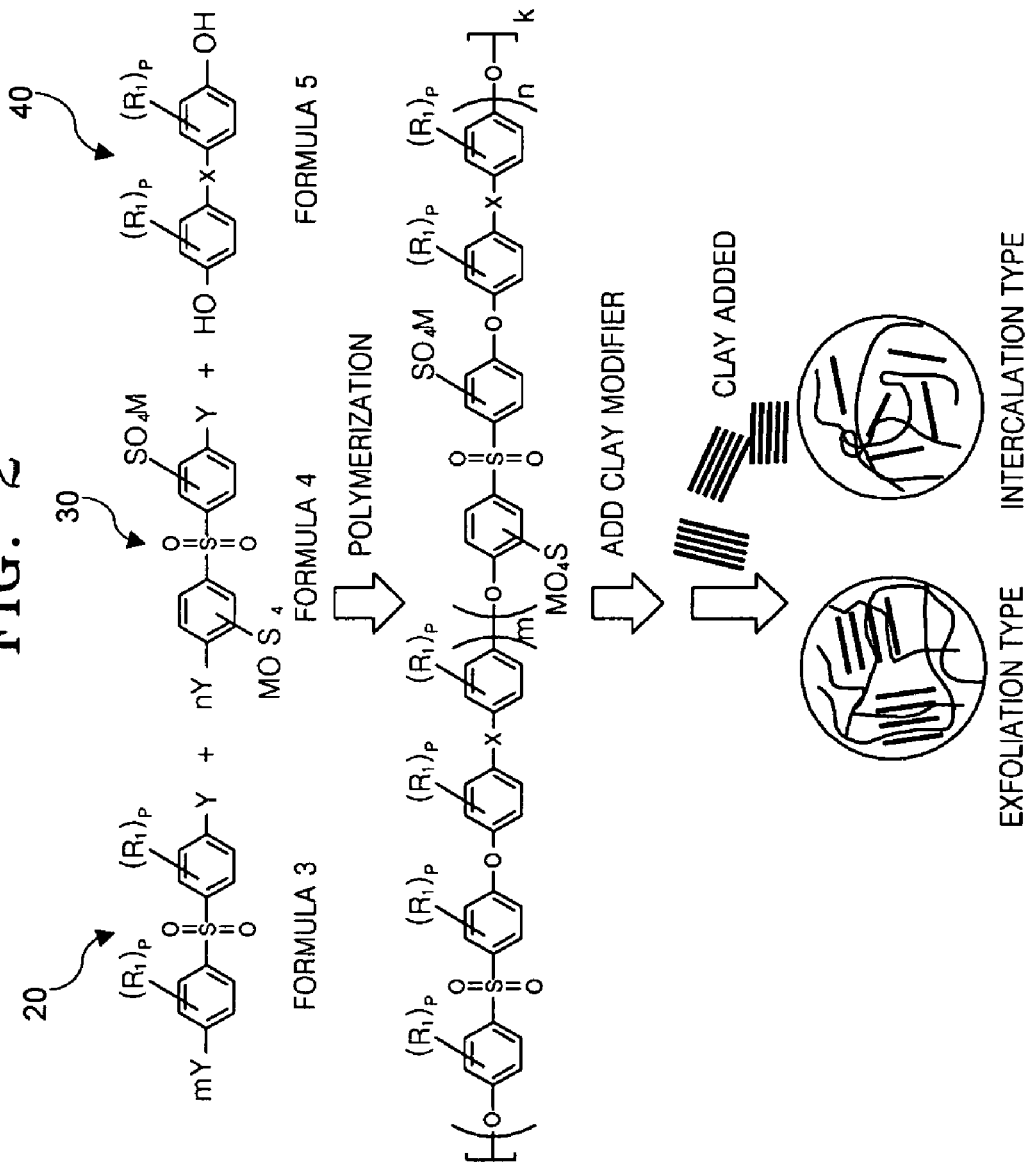
FIG. 2 is a view for explaining a second method of preparing a nanocomposite according to another embodiment of the present invention.

FIG. 2 is a view for explaining a second method of preparing a nanocomposite according to another embodiment of the present invention. In the second method, the first polymerized monomer 20 in formula 3, the second polymerized monomer 30 in formula 4, and the diol compounds 40 in formula 5 are mixed with a solvent and heated. Then, a polymerization reaction is performed. Here, the heating conditions, the solvents, the amount of the first, second, and third polymerized monomers 20, 30, 40, and the kinds of the diol compounds 40 are the same as in the first method.

The clay modifier is added at the end of the polymerization reaction, if necessary, and the resultant is polymerized at 50-195° C. to attach the clay modifier at the end portions of the sulfonated polysulfone polymer chains. Generally, when the heat-treatment temperature is above 195° C., a reverse polymerization reaction occurs and a nanocomposite with desired molecular weight is hardly obtained. Generally, when the heat-treatment temperature is below 50° C., reactivity is unacceptably reduced.

After the above resultant is cooled down to 20-150° C., the clay dispersed solution 10 obtained by dispersing nonmodified clay with a dispersion medium is added and is stirred for 6-48 hours, in particular about 24 hours, at 70° C. Then the nanocomposite according to the current embodiment of the present invention can be obtained using a work-up process precipitating the resultant in distilled water.

Types and amounts of the clay modifier, the nonmodified clay, and the dispersion medium are the same as in the first method described above.

FIG. 3 is a view for explaining a third method of preparing a nanocomposite according to another embodiment of the present invention. The third method is as follows.

The first polymerized monomer 20 in formula 3, the second polymerized monomer 30 in formula 4, and the diol compounds 40 in formula 5 are mixed with a solvent and heated. Then, a polymerization reaction is performed to prepare the sulfonated polysulfone in formula 1. Here, the polymerization temperature is a near ambient temperature in the range of 20-50° C.

After the sulfonated polysulfone in formula 1 is dissolved with a solvent, the clay dispersed solution 10 obtained by dispersing nonmodified clay with a dispersion medium is added and the resultant is stirred vigorously for 6-48 hours, in particular about 24 hours, at a near ambient temperature in the range of 20-100° C. Here, dimethylacetamide, N-methylpyrrolidone, dimethylformamide, dimethylsulfoxide, or a combination thereof is used as the solvent and an amount of the solvent is 100-600 parts by weight based on 100 parts by weight of the sulfonated polysulfone in formula 1.

Then, the nanocomposite according to the current embodiment of the present invention can be obtained using a work-up process precipitating the resultant in distilled water.

When a nanocomposite is prepared according to the third method, if necessary, a clay modifier is added at the completion of the polymer polymerization. The types and the amount of clay modifier are the same as described above.

The weight-average molecular weight of the sulfonated polysulfone obtained according to the third method is 20,000-500,000. The number-average molecular weight is 10,000-300,000 and is a polymer having a high molecular weight. Generally, when the amounts of the weight-average molecular weight or the number-average molecular weight are less than these respective ranges, membrane formability is reduced and an electrolyte membrane is hardly obtained. Generally, when the amounts are above this range, a viscosity of a mixture including the sulfonated polysulfone and the solvent is high, and thus workability related to a coating process is poor.

The nanocomposite of an aspect of the present invention can be identified by x-ray diffraction pattern analysis.

When nonmodified clay is dried, the diffraction pattern of the nonmodified clay is identified at $2\theta$ equal to $7.8°$ (interlayer space is 1.14 Å) and when the interlayer space is increased, the value of $2\theta$ of the x-ray diffraction pattern is moved to $1.2°$ (the lowest limit of the machine) and finally the diffraction pattern disappears (exfoliated structure). The samples for X-ray diffraction are in the form of powder or thin film and CuK-$\alpha$ characteristic x-ray wavelength (1.541 Å) is measured at an ambient temperature ($20°$ C.) and in air.

Referring to the result of X-ray diffraction pattern analysis, the peak of a (001) plane of clay disappears, indicating an exfoliated structure, or is broadened indicating an intercalation structure.

A nanocomposite electrolyte membrane of a fuel cell can be formed using the nanocomposite of an aspect of the present invention and a method of manufacturing the nanocomposite electrolyte membrane according to an embodiment of the present invention, is as follows.

The composite for forming a nanocomposite electrolyte membrane obtained, for example, by mixing the nanocomposite according to one or more of the above-described processes, and a solvent is used to form the nanocomposite electrolyte membrane using a casting or a coating method. Here, Dimethylacetamide is used as the solvent and an amount is 100-600 parts by weight based on 100 parts by weight of the nanocomposite. Generally, when the amount is above or below this range, operating performance during the casting or coating process is reduced and mechanical properties are also reduced.

In some cases, the nanocomposite adjusted for an OH group to exist at an end portion of the sulfonated polysulfone is dissolved with a solvent and then, diisocyanate and polyalcohol are added. Through the process of casting or coating, a nanocomposite electrolyte membrane can be formed. As described above, using diisocyanate and polyalcohol brings excellent membrane formability and thus, performance of the casting or coating process is convenient and mechanical properties are enhanced. In particular, if diisocyanate and polyalcohol are applied when the molecular weight of the sulfonated polysulfone is below 10,000, mechanical strength of a membrane is improved.

Specific examples of diisocyanate include, but are not limited to, p-phenylene diisocyanate, 1,6-hexamethylene diisocyanate, toluene diisocyanate, 1,5-naphthalene diisocyanate, isophorone diisocyanate, 4,4'-diphenylmethane diisocyanate, and cyclomethane diisocyanate and the amount is 0.1-10 parts by weight of the 100 parts by weight of the sulfonated polysulfone. A specific example of polyalcohol includes poly (2-hydroxyethyl methacrylate) and the amount is 0.1-10 parts by weight based on 100 parts by weight of the sulfonated polysulfone.

A thickness of the nanocomposite electrolyte membrane according to an aspect of the present invention is not restricted. However, when the nanocomposite electrolyte membrane is too thin, the strength of the nanocomposite electrolyte membrane may be greatly reduced. When the nanocomposite electrolyte membrane is too thick, thermal resistance of a fuel cell may be excessively increased. Considering this, the thickness of the nanocomposite electrolyte membrane can be in the range of about 30-200 µm.

Hereinafter, examples of preparing a fuel cell using a nanocomposite electrolyte membrane according to an embodiment of the present invention will be described in detail.

A nanocomposite electrolyte membrane according to an embodiment of the present invention can be applied to any kind of fuel cell which employs an electrolyte membrane containing a polymer electrolyte, for example, a polymer electrolyte membrane fuel cell (PEMFC) using hydrogen as a fuel. In particular, the nanocomposite electrolyte membrane according to the present invention is more useful in direct methanol fuel cells (DMFCs) using a mixed vapor of methanol and water or an aqueous methanol solution as a fuel.

In a fuel cell according to aspects of the present invention which includes a cathode, where oxygen is reduced, an anode, where fuel is oxidized, and an electrolyte membrane disposed between the cathode and the anode, a nanocomposite electrolyte membrane described above is used as the electrolyte membrane.

While not required in all aspects, the cathode includes a catalyst layer for facilitating oxygen reduction. This catalyst layer contains catalyst particles and a polymer with cation exchange groups. For example, a carbon supported platinum (Pt/C) catalyst can be used as the cathode catalyst.

While not required in all aspects, the anode includes a catalyst layer for facilitating the oxidation of fuel, such as hydrogen, natural gas, methanol, ethanol, etc. This anode catalyst layer contains catalyst particles and a polymer with cation exchange groups. Examples of a catalyst for the anode catalyst layer include, but are not limited to, a Pt/C catalyst, a carbon supported platinum-ruthenium (Pt—Ru/C) catalyst, etc. The Pt—Ru/C catalyst is more useful in fuel cells in which organic fuels, except for hydrogen, are directly supplied to the anode.

Each of the catalysts for the cathode and the anode contain catalytic metal particles and a catalyst support. Suitable catalyst supports include conductive solid powder, such as carbon powder, with micropores for incorporating catalytic metal particles therein. Examples of carbon powder include carbon black, Ketzen black, acetylene black, activated carbon powder, carbon nano-fibers, and a mixture of the foregoing materials. The above-described examples of polymers having cation exchange groups that can be used for the cathode and anode catalyst layers.

The cathode catalyst and anode catalyst layers directly contact the nanocomposite electrolyte membrane.

While not required in all aspects, each of the cathode and the anode may further include a gas diffusion layer. The gas diffusion layer contains porous materials that are electrically conductive and acts as a current collector and as an entry/exit path of reactants and reaction products. Examples of the gas diffusion layer include, but are not limited to, carbon paper, and preferably, waterproofed carbon paper, and more preferably, waterproof carbon paper with a waterproof carbon black layer. Waterproof carbon paper for the gas diffusion layer contains a hydrophobic polymer, such as polytetrafluoroethylene (PTFE), which is sintered. The use of waterproof materials for the gas diffusion layer is for enabling both polar liquid and gaseous reactants to pass through the gas diffusion layer. In waterproof carbon paper with a waterproof carbon black layer, the waterproof carbon black layer contains carbon black and a hydrophobic polymer, such as PTFE, as a binder. This waterproof carbon black layer is attached to a surface of a waterproof carbon paper as described above. The hydrophobic polymer of the waterproof carbon black layer is sintered.

Various methods disclosed can be used to manufacture the cathode and the anode. Thus, detailed descriptions thereof will be omitted here.

Fuels which can be supplied to the anode of a fuel cell according to the current embodiment of the present invention include hydrogen, natural gas, methanol, ethanol, etc. Preferred fuels include aqueous solutions of polar organic fuels, for example, methanol, ethanol, and etc. A more preferred fuel is an aqueous methanol solution. A fuel cell according to the current embodiment of the present invention is compatible with a higher concentration of aqueous methanol fuel because the crossover of polar organic fuels is greatly suppressed by the nanocomposite electrolyte membrane, in contrast to conventional DMFCs that allow only the use of a low-concentration methanol solution of 6-15% due to the problem of methanol crossover. Clearly, in the case of using a low-concentration methanol solution, since the nanocomposite electrolyte membrane of the fuel cell according to the current embodiment of the present invention can suppress crossover of a polar organic fuel, the lifespan of the fuel cell is further extended and the energy efficiency of the fuel cell is further improved.

The present invention will be described in greater detail with reference to the following examples. The following examples are for illustrative purposes and are not intended to limit the scope of the invention.

EXAMPLE 1-1

Manufacturing of Nanocomposite and Nanocomposite Electrolyte Membrane 0.1 moles of S-DCDPS, 0.35 moles of DCDPS, 0.459 moles of HFIPDP, nonmodified clay such as montmorillonite (3 parts by weight: based on 100 parts by weight of the total weight of monomer) and 0.55 moles of potassium carbonate were mixed. Using 120 ml of N-methylpyrrolidone (NMP) and 100 ml of toluene as a solvent, the mixture was refluxed at 160° C. for 12 hours, and generated water was removed. When water was no longer found through a dean stock, the toluene was removed through a valve. Then the temperature of the reacted mixture was raised to 180° C. in 2 hours and a polymerization reaction was performed for 4 hours.

As polymerization progressed, the viscosity of the solution was raised. After completion of polymerization, the polymerized solution was cooled down to an ambient temperature (20° C.) and then poured into triple distilled water (1000 ml) to obtain precipitate. The resultant precipitate was washed 3 times and dried.

70 parts by weight of the nanocomposite obtained according to the above process was dissolved in 30 parts by weight of dimethylacetamide and the remainder which was not dissolved was removed with 100-mesh. After, the resultant was filtered, the filtered solution was thermally concentrated to 40% by weight and the viscosity was adjusted to provide a composite for forming a nanocomposite electrolyte membrane by adding 2 parts by weight of phenyl isocyanate therein.

The composite obtained according to the above process was coated on a glass substrate using a mayor bar and then, heated to temperatures of 60° C., 80° C., 120° C., 150° C. and 170° C. sequentially and dried to complete the formation of a nanocomposite electrolyte membrane with a thickness of about 50 μm.

EXAMPLE 1-2

Manufacturing of Nanocomposite and Nanocomposite Electrolyte Membrane

A nanocomposite electrolyte membrane was formed as in Example 1-1, except that the amount of clay was 5 parts by weight based on 100 parts by weight of total monomer.

EXAMPLE 1-3

Manufacturing of Nanocomposite and Nanocomposite Electrolyte Membrane

A nanocomposite electrolyte membrane was formed as in Example 1-1, except that the amounts of DCDPS, HFIPDP, and potassium carbonate were 0.407 moles, 0.56 moles, and 0.672 moles, respectively. Furthermore, 0.00357 moles of 4-aminophenol (AP), a clay modifier, was added.

EXAMPLE 1-4

Manufacturing of Nanocomposite and Nanocomposite Electrolyte Membrane

A nanocomposite electrolyte membrane was formed as in Example 1-1, except that the amount of clay was 10 parts by weight based on 100 parts by weight of total monomer.

EXAMPLE 1-5

Manufacturing of Nanocomposite and Nanocomposite Electrolyte Membrane

A nanocomposite electrolyte membrane was formed as in Example 1-3, except that the amounts of DCDPS, HFIPDP, and potassium carbonate were 0.25 moles, 0.357 moles, and 0.428 moles, respectively.

EXAMPLE 1-6

Manufacturing of Nanocomposite and Nanocomposite Electrolyte Membrane

A nanocomposite electrolyte membrane was formed as in Example 1-1, except that the amounts of DCDPS, HFIPDP, and clay were 0.25 moles, 0.357 moles and 5 parts by weight, respectively.

EXAMPLE 1-7

Manufacturing of Nanocomposite and Nanocomposite Electrolyte Membrane

A nanocomposite electrolyte membrane was formed as in Example 1-1, except that the amounts of DCDPS and HFIPDP were 0.19 moles and 0.305 moles, respectively.

EXAMPLE 2-1

Manufacturing of Nanocomposite and Nanocomposite Electrolyte Membrane 0.1 moles of S-DCDPS, 0.35 moles of DCDPS, 0.459 moles of HFIPDP, and 0.55 moles of potassium carbonate were mixed. Using 120 ml of NMP and 100 ml of toluene as a solvent, the mixture was refluxed at 160° C. for 12 hours, and generated water was removed. When water was no longer found through a dean stock, the toluene was removed through a valve. Then the temperature of the reacted mixture was raised to 180° C. in 2 hours and a polymerization reaction was performed for 4 hours producing a polymerization group. Then the temperature of the polymerization group was cooled down to 70° C. and nonmodified clay such as montmorillonite (3 parts by weight: based on 100 parts by weight of the total weight of monomer) was injected into the polymerization group followed by further reacting for 24 hours at the same temperature. The polymer collection and treatment proceeded as described in Example 1-1.

EXAMPLE 2-2

Manufacturing of Nanocomposite and Nanocomposite Electrolyte Membrane

A nanocomposite electrolyte membrane was formed as in Example 2-1, except that the amounts of DCDPS and HFIPDP were 0.25 moles and 0.357 moles, respectively, and 0.00357 moles of AP were added to the mix.

EXAMPLE 2-3

Manufacturing of Nanocomposite and Nanocomposite Electrolyte Membrane

A nanocomposite electrolyte membrane was formed as in Example 2-2, except that 4-aminophenol (AP) was not added.

EXAMPLE 3

Manufacturing of Nanocomposite and Nanocomposite Electrolyte Membrane

When a nanocomposite was prepared according to the third method, a clay modifier was added on the completion of the polymer polymerization. The type and the amount of the clay modifiers used were the same as described above.

0.1 moles of S-DCDPS, 0.35 moles of DCDPS, 0.459 moles of HFIPDP, and 0.55 moles of potassium carbonate were mixed. Using 120 ml of NMP and 100 ml of toluene as a solvent, the mixture was refluxed at 160° C. for 12 hours, and generated water was removed. When water was no longer found through a dean stock, the toluene was removed through a valve. Then the temperature of the reacted mixture was raised to 180° C. in 2 hours and a polymerization reaction was performed for 4 hours.

As polymerization progressed, the viscosity of the solution was raised. After completion of polymerization, the polymerized solution was cooled down to an ambient temperature (20° C.) and then poured into triple distilled water (1000 ml) to obtain precipitate. The resultant precipitate was washed 3 times and dried to synthesize polysulfone.

70 parts by weight of polysulfone obtained according to the above process was dissolved in 30 parts by weight of dimethylacetamide.

Then the clay dispersed solution dispersing nonmodified clay such as montmorillonite (3 parts by weight: based on 100 parts by weight of the total weight of monomer) with dimethylacetamide was added to the polysulfone solution and vigorously stirred for 24 hours or more at about 70° C. The remaining portion which was not dissolved was removed with 100-mesh.

After the resultant was filtered, the filtered solution was thermally concentrated to 40% by weight and the viscosity was adjusted to provide a composite for forming a nanocomposite electrolyte membrane by adding 2 parts by weight of phenyl isocyanate.

The composite obtained according to the above process was coated on a glass substrate using a mayor bar and then, heated to temperatures of 60° C., 80° C., 120° C., 150° C. and 170° C. sequentially and dried to complete the formation of a nanocomposite electrolyte membrane with a thickness of about 50 μm.

COMPARATIVE EXAMPLE 1

Comparative Example 1 was formed in the same manner as in Example 1-1, except that clay was not added.

0.1 moles of S-DCDPS, 0.35 moles of DCDPS, 0.459 moles of HFIPDP, and 0.55 moles of potassium carbonate were mixed. Using 120 ml of NMP and 100 ml of toluene as a solvent, the mixture was refluxed at 160° C. for 12 hours, and generated water was removed. When water was no longer found through a dean stock, the toluene was removed through a valve. Then, the temperature of the reacted mixture was raised to 180° C. in 2 hours and a polymerization reaction was performed for 4 hours.

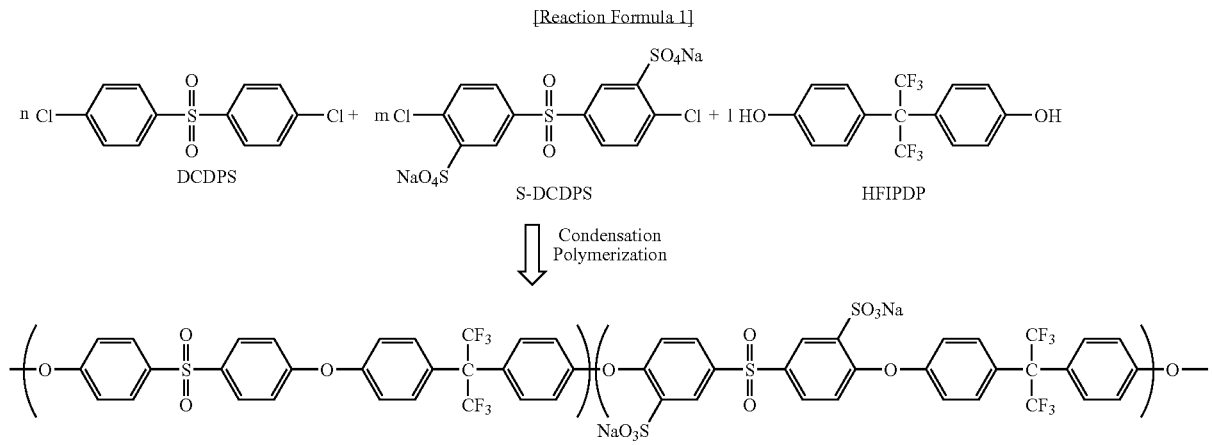

[Reaction Formula 1]

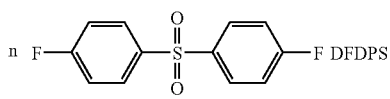 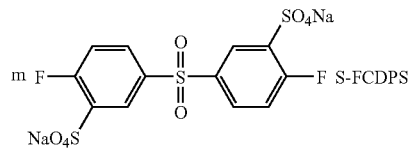

COMPARATIVE EXAMPLE 2

Comparative Example 2 was polymerized in the same manner as in Comparative Example 1 using S-DCDPS (0.1 moles), DCDPS (0.1 moles), HFIPDP (0.204 moles), and potassium carbonate (0.2448 moles).

COMPARATIVE EXAMPLE 3

Comparative Example 3 was polymerized in the same manner as in Comparative Example 1, except that the amounts of DCDPS, HFIPDP, and potassium carbonate were 0.25 moles, 0.357 moles, and 0.4284 moles, respectively.

A nuclear magnetic resonance (NMR) spectrum analysis for a nanocomposite obtained according to Example 1-1 was performed and the structure thereof was identified. The results are shown in FIGS. 4 through 6.

Figure 4:
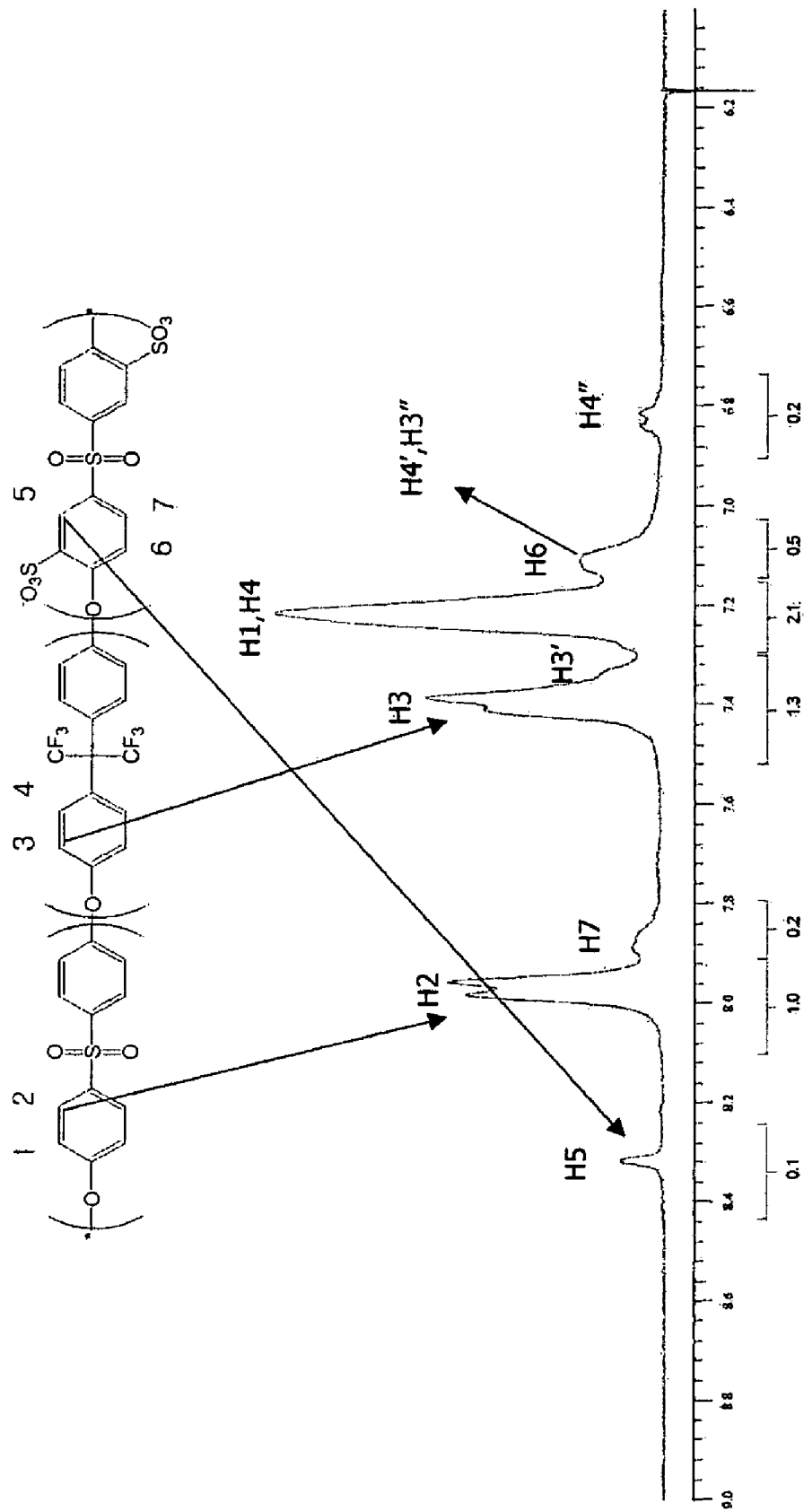
FIGS. 4 and 5 are nuclear magnetic resonance (NMR) spectrums of a nanocomposite obtained according to Example 1-1, an embodiment of the present invention.
Figure 5:
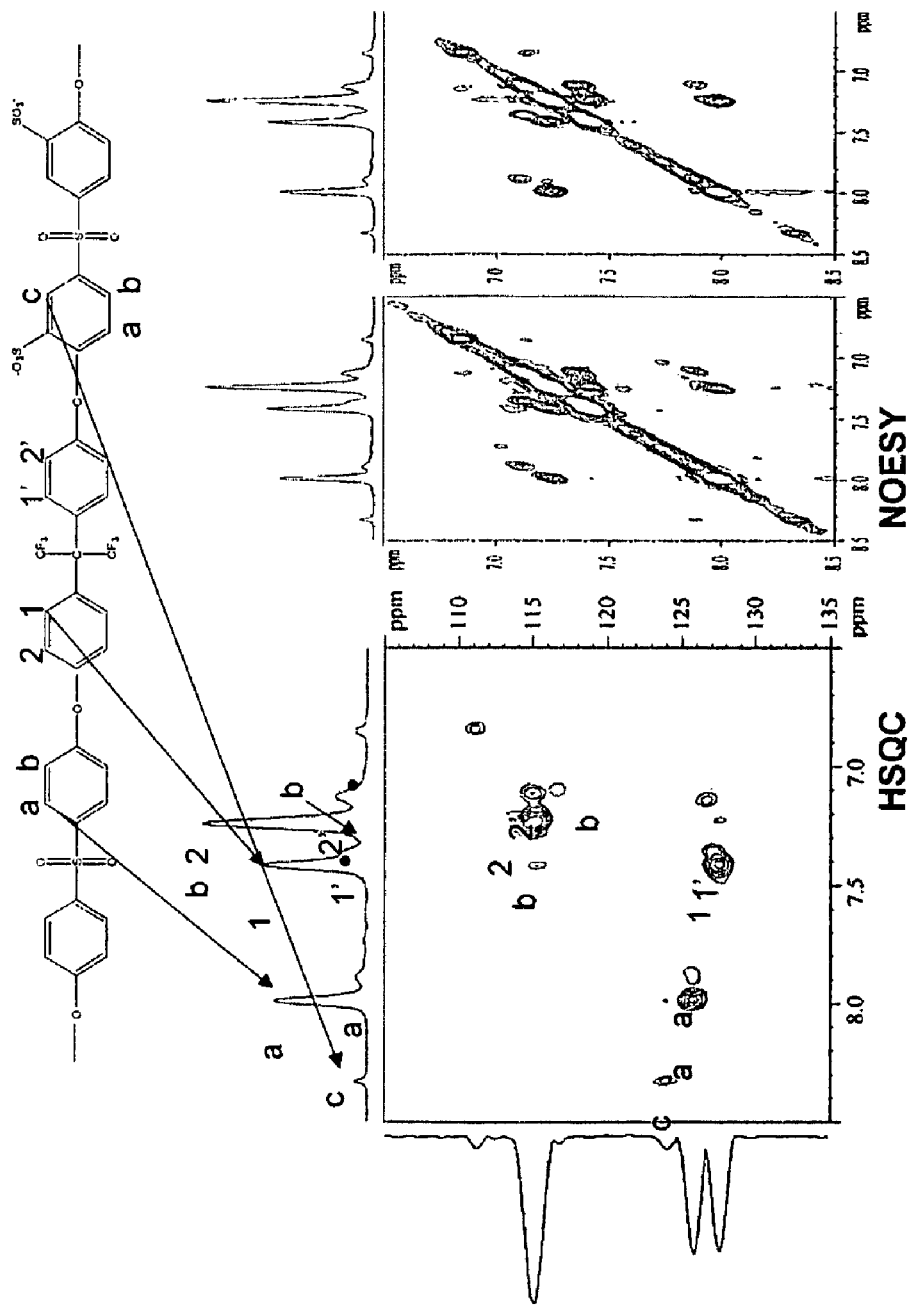

Referring to FIG. 4, using 2, 3 and 5 peak areas, a ratio of each monomer existing in a polymer could be identified. Also, referring to FIG. 4, the ratio of synthesized polymers was identified from the area ratio of peaks: 8.3 ppm (sulfonated DCDPS proton), 8.0 ppm (DCDPS proton), and 7.43 ppm (HFIPDP proton).

Figure 6:
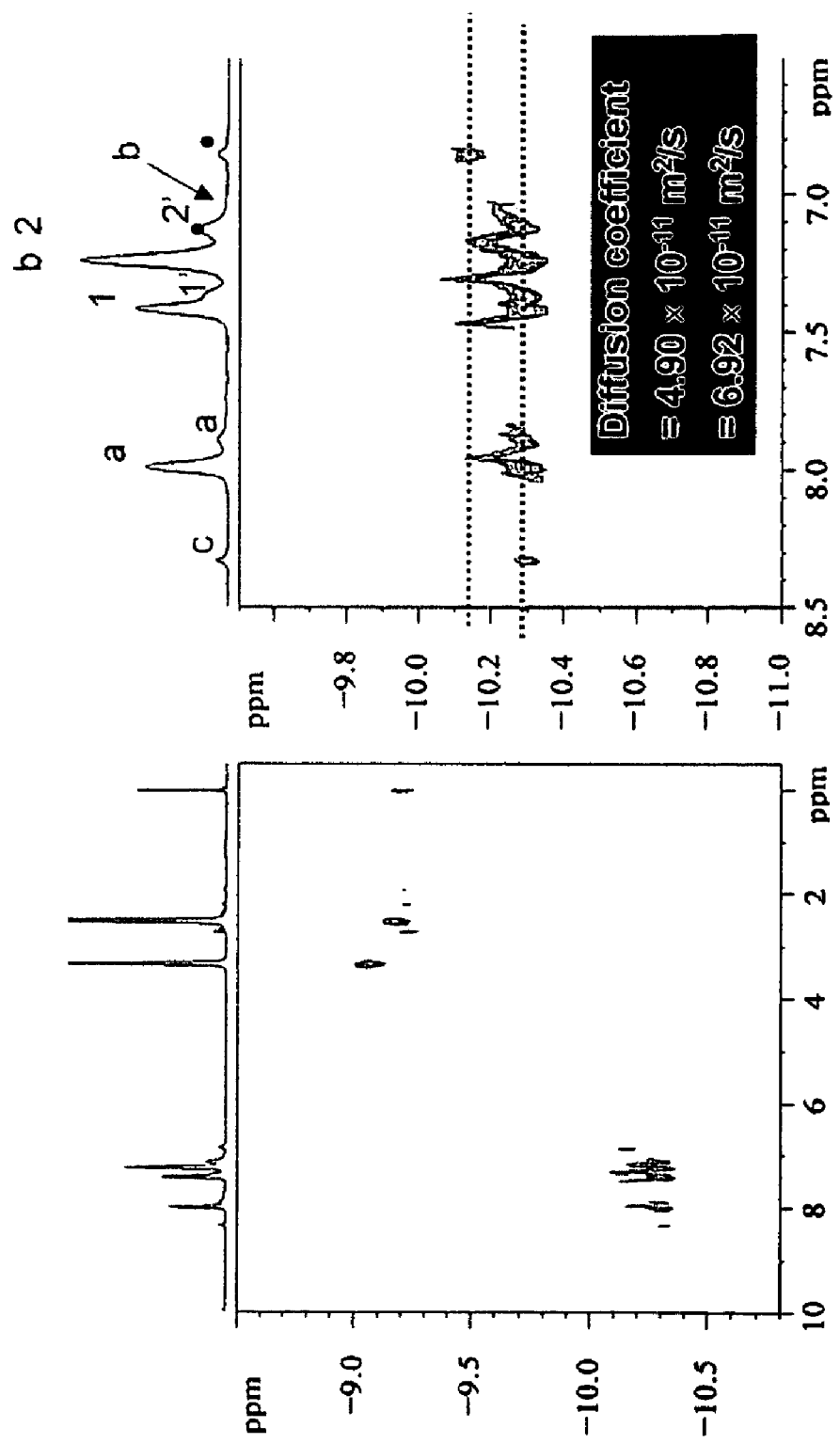
FIG. 6 is a diffusion-ordered nuclear magnetic resonance (DOSY-NMR) spectrum of a nanocomposite obtained according to Example 1-1 of the present invention.

FIG. 6 illustrates the result of a DOSY-NMR spectrum of a nanocomposite obtained according to Example 1-1 of the present invention. Referring to FIG. 6, DOSY-NMR was used to identify the existence of copolymer and even clay structures in a polymer synthesized according to Example 1-1, and the molecular weight distribution could be identified through molecular weight distribution gel-permeated chromatography.

TABLE 1

| No | S-DCDPS (moles) | DCDPS (moles) | HFIPDP (moles) | AP(4-aminophenol) (moles) | clay (100 parts by weight of total weight of monomer) |
|----|-----------------|---------------|----------------|--------------------------|------------------------------------------------------|
| 1  | 0.1 | 0.25 | 0.357 | 0.00357 | 3 |
| 2  | 0.1 | 0.25 | 0.357 | 0.00357 | 5 |
| 3  | 0.1 | 0.25 | 0.357 | 0.00357 | 10 |
| 4  | 0.1 | 0.35 | 0.459 | Not added | 3 |
| 5  | 0.1 | 0.35 | 0.459 | Not added | 5 |
| 6  | 0.1 | 0.35 | 0.459 | Not added | 10 |
| 7  | 0.1 | 0.45 | 0.598 | Not added | 3 |
| 8  | 0.1 | 0.45 | 0.598 | Not added | 5 |
| 9  | 0.1 | 0.45 | 0.598 | Not added | 10 |

Figure 8:
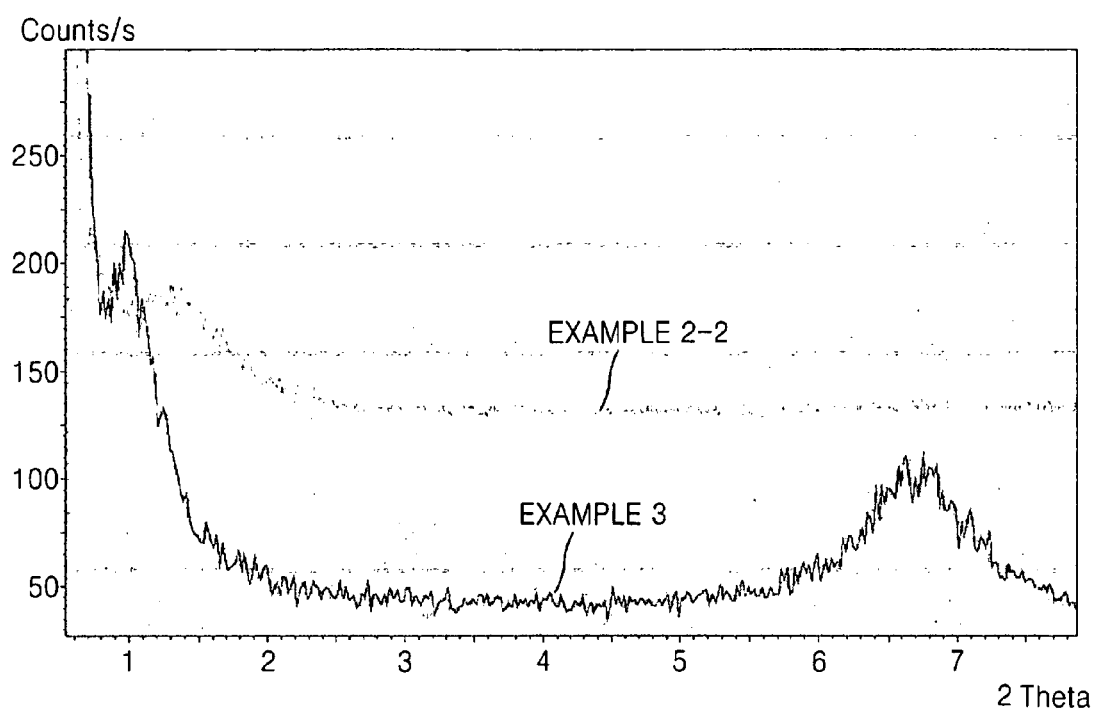

X-ray diffraction analyses of the nanocomposites manufactured according to Examples 2-2 and 3 were performed and the results are shown in FIG. 8.

Figure 7:
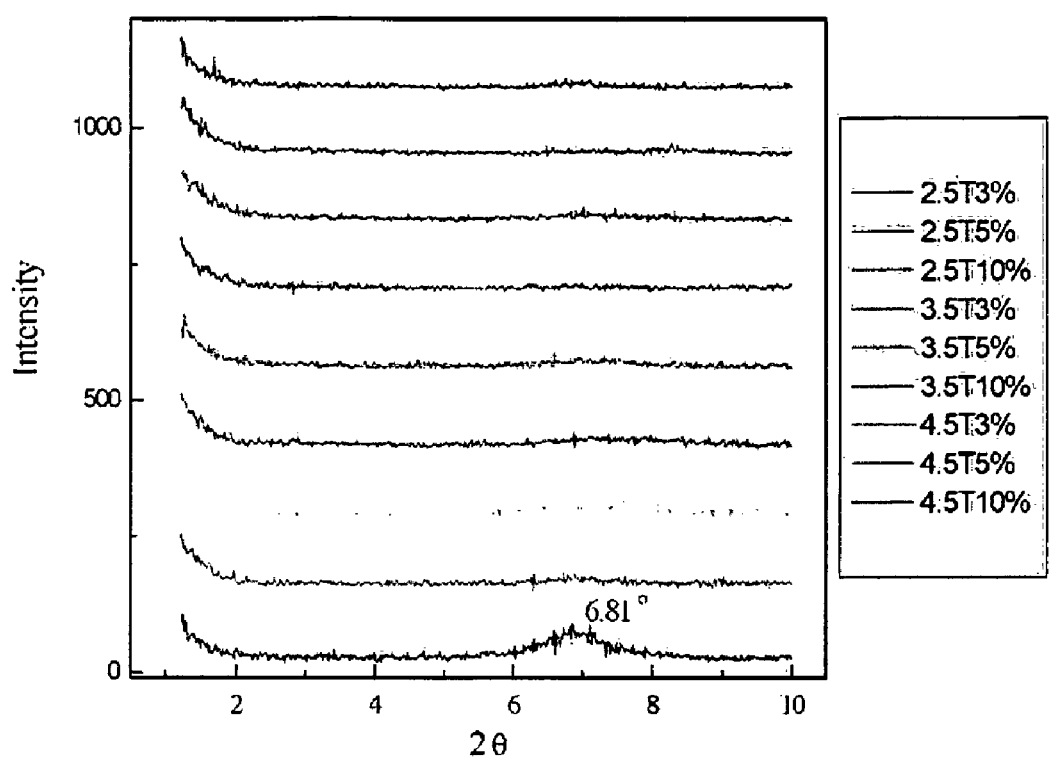
FIGS. 7 and 8 are graphs showing results of X-ray diffraction analyses of nanocomposites obtained according to embodiments of the present invention.

As shown in FIGS. 7 and 8, the peak due to regularities of the plane (001) of clay did not occur but an exfoliation structure was shown instead.

Figure 9:
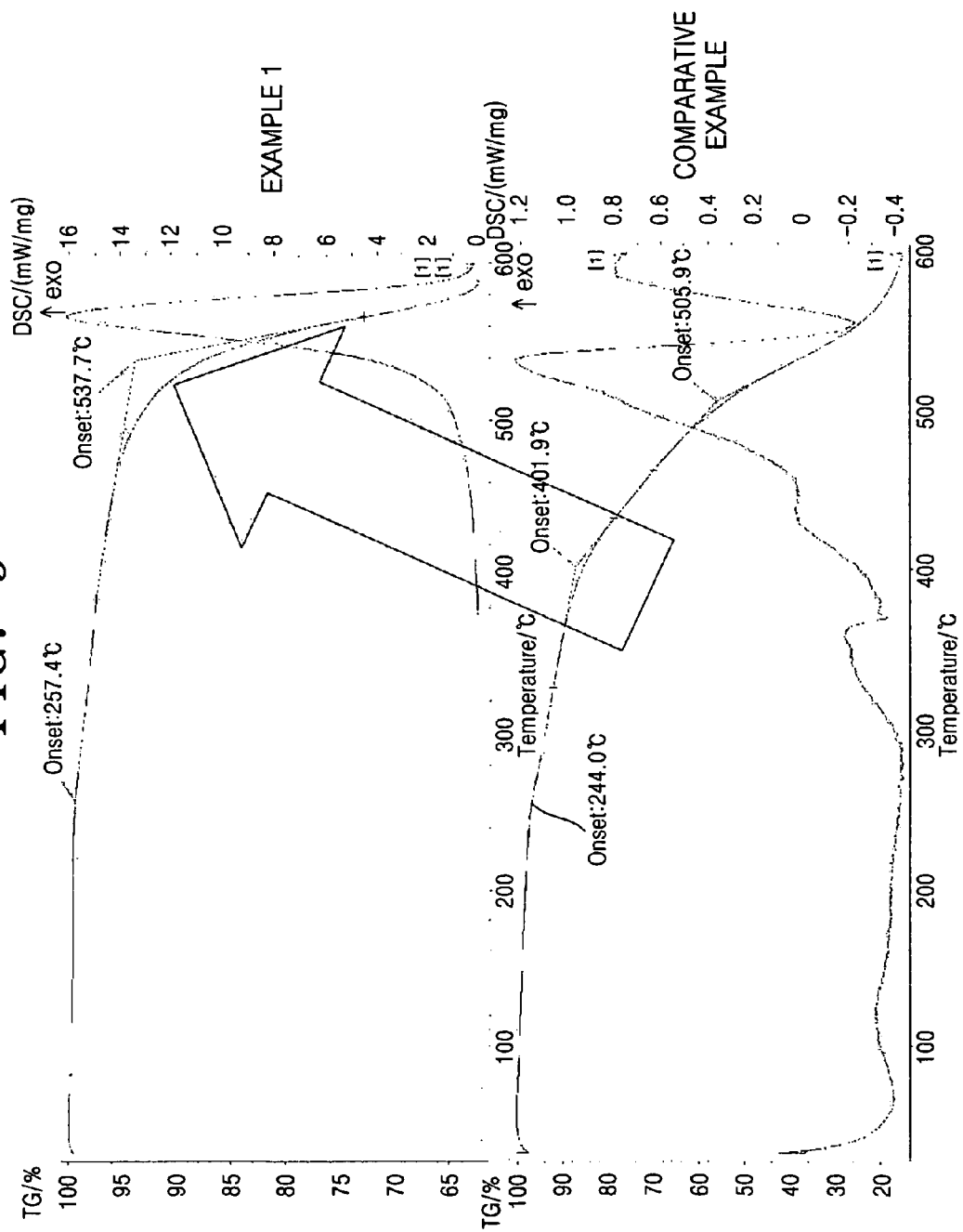
FIG. 9 is a graph showing results of thermogravimetric analyses of nanocomposites obtained according to Example 1-1 and Comparative Example 1, another embodiment of the present invention.

Thermal weight analysis for the nanocomposite manufactured according to Example 1-1 and Comparative Example 1 was performed and the result is shown in FIG. 9.

Molecular weight and polydispersity (Mw/Mn) of the nanocomposite manufactured according to Examples and Comparative Examples were investigated and the result is shown in Table 2 below.

TABLE 2

| | S-DCDPS/DCDPS/HFIPDP ratio of mole (Amount of clay based on 100 parts by weight of total weight of monomer: parts by weight) | Mn | Mw | Mp | Mw/Mn |
|---|---|---|---|---|---|
| Example 1-1 | 1/3.5/4.59 (3 parts by weight) | 21,166 | 40,161 | 42,162 | 1.90 |
| Example 1-2 | 1/3.5/4.59 (5 parts by weight) | 17,207 | 31,318 | 32,611 | 1.82 |
| Example 1-5 | 1/2.5/3.57(3%), aminophenol 0.0357 moles is added later | 26,257 | 50,245 | 54,407 | 1.91 |
| Example 2-1 | 1/3.5/4.59 (5%) | 35,326 | 66,738 | 70,639 | 1.89 |
| Example 2-2 | 1/2.5/3.57(3%), aminophenol 0.0357 moles is added later | 34,503 | 65,685 | 71,336 | 1.90 |
| Example 2-3 | 1/2.5/3.57(5 parts by weight) | 38,249 | 73,075 | 80,255 | 1.91 |
| Comparative Example 1 | 1/3.5/4.59 (clay is not added) | 34,379 | 62,544 | 68,712 | 1.82 |
| Comparative Example 2 | 1/1/2.04 (clay is not added) | 33,564 | 60,379 | 59,500 | 1.80 |
| Comparative Example 3 | 1/2.5/3.57, 4-aminophenol 0.0357 moles is added later | 20,035 | 33,317 | 34,438 | 1.66 |

A nanocomposite was manufactured in the same manner as in Example 1-1, except that the amounts of S-DCDPS, DCDPS, HFIPDP, and non-modified clay were as shown in Table 1, illustrated below. X-ray diffraction analysis was performed and the result is shown in FIG. 7.

It was determined that polymers could be obtained, and even when clay existed referring to Table 1.

The ionic conductivity of the nanocomposite electrolyte membranes manufactured in Examples 1-7, 2-1, 2-3 and Comparative Example 1 was measured using a 4-point probe method at 25° C., 50° C., and 75° C. The result is shown in Table 3 below.

TABLE 3

|  | Ionic conductivity (S/cm) |
| --- | --- |
| Example 1-7 | 5.5E−03 |
| Example 2-1 | 1.25E−03 |
| Example 2-3 | 4.7E−03 |
| Comparative Example 1 | 1.26E−03 |

Referring to Table 3, even though the Examples include clay, the ionic conductivity of the nanocomposite electrolyte membrane was high.

EXAMPLE 4

A Fuel Cell with a Nanocomposite Electrolyte Membrane

A fuel cell was manufactured from the nanocomposite electrolyte membrane of Example 1-1, an anode with a Pt—Ru catalyst, and a cathode with a Pt catalyst. Variation in cell voltage with respect to current density was measured for the fuel cell. The operating temperature was about 50° C., a 2M methanol solution was used as a fuel, and air was used as an oxidizing agent.

COMPARATIVE EXAMPLE 4

A fuel cell was manufactured in the same manner as in Example 4, except that NAFION 115 (available from Dupont) was used instead of the nanocomposite electrolyte membrane manufactured in Example 1-1. Variation in cell voltage with respect to current density was measured for the fuel cell under the same conditions as in Example 4.

Evaluation Test 1: Anti-Methanol Permeation Performance

When methanol permeates a nanocomposite electrolyte membrane, the nanocomposite electrolyte membrane swells and increases in volume. Based on this phenomenon, anti-methanol permeation performance was measured for a degree of swelling by immersing the nanocomposite electrolyte membrane in a methanol solution.

The nanocomposite electrolyte membranes of Example 1-1 and Comparative Example 1 were immersed, separately, in a 4M methanol solution and a 1:1 methanol and water solution by mole, each for 2 hours, and volume increases were measured. Here, the percentages refer to the percentage volume increase (not shown) with respect to the initial volume of the electrolyte membrane prior to immersion.

The nanocomposite electrolyte membrane of Example 1-1 had a much smaller volume increase than Comparative Example 1 after immersion in the methanol solutions, indicating the improved anti-methanol permeation performance of the nanocomposite electrolyte membrane of Example 1-1. It is understood that this anti-methanol permeation effect of the nanocomposite electrolyte membrane is apparent for other polar organic fuels, including ethanol.

Therefore, when the nanocomposite electrolyte membrane according to the present invention is applied to a fuel cell using a methanol solution as a fuel, crossover of the methanol can be effectively suppressed, with improved working efficiency and longer lifespan of the fuel cell.

Evaluation Test 2: Fuel Cell Performance Comparison

According to the result (not shown), the cell voltage of the fuel cell of Example 4 was higher than the cell voltage of the fuel cell of Comparative Example 4 at a given current density, indicating a greater working efficiency of the fuel cell. This result shows that the nanocomposite electrolyte membrane according to the present invention has good ionic conductivity, in addition to the ability to effectively suppress crossover of methanol.

As described above, in a nanocomposite according to an aspect of the present invention, a nanoscale amount of nonmodified clay having a layered structure is dispersed in sulfonated polysulfone having excellent ionic conductivity, so that the nanocomposite according to an aspect of the present invention has excellent ionic conductivity and mechanical properties. A nanocomposite electrolyte membrane formed using such a nanocomposite has an improved ability to suppress permeation of polar organic fuels, such as methanol, and appropriate ionic conductivity. In addition, a fuel cell with the nanocomposite electrolyte membrane according to an aspect of the present invention can effectively prevent crossover of methanol used as a fuel, thereby providing improved working efficiency and extended lifespan.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A nanocomposite comprising:
   a sulfonated polysulfone, wherein the sulfonated polysulfone is represented by formula 1 below:

[Formula 1]

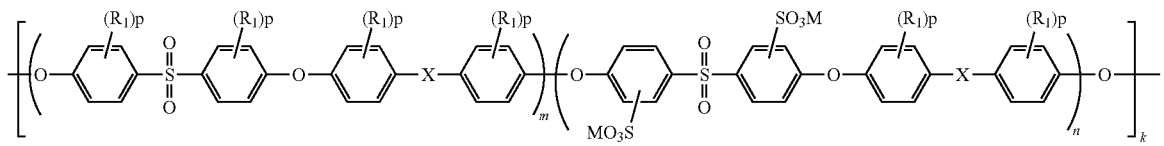

where, $R_1$ is the same or different and is an C1-C10 alkyl group, a C2-C10 alkenyl group, a phenyl group or a nitro group, p is an integer of 0-4, X is —C(CF$_3$)$_2$—, —C(CH$_3$)$_2$— or —P(=O)Y'—(Y' is H or C$_6$H$_5$), M is Na, K, or H, m is 0.1-10, n is 0.1-10, and k is 5-500; and a nonmodified clay dispersed in the sulfonated polysulfone, the nonmodified clay having a layered structure, and the nonmodified clay being intercalated with the sulfonated polysulfone, or the layers of the layered structure being exfoliated.

2. The nanocomposite of claim 1, wherein the sulfonated polysulfone is represented by formula 2 below:

[Formula 2]

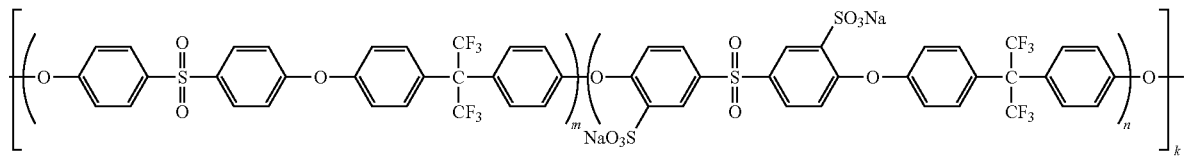

where, m is 0.1-4, n is 0.1-4, and k is 5-500.

3. The nanocomposite of claim 1, wherein both end portions of the sulfonated polysulfone are end-capped by a clay modifier to provide substitutability with the clay.

4. The nanocomposite of claim 3, wherein the clay modifier is selected from the group consisting of:
2-acetamidophenol, 3-acetamidophenol, 2,6-di-tert-butyl-4-methylphenol, 3-ethylphenol, 2-amino-4-chlorophenol, 6-amino-2,4-dichloro-3-methylphenol, 4-amino-3-methylphenol, 2-amino-3-nitrophenol, 2-aminophenol, 2-sec-butylphenol, 3-aminophenol, 3-diethylaminophenol, 4,4'-sulfonyldiphenol, 2-methyl-3-nitrophenyl, 3-tert-butylphenol, 2,3-dimethoxyphenol, 4-amino-2,5-dimethylphenol, 2,6-dimethyl-4-nitrophenol, 4-sec-butylphenol, 4-isopropylphenol, 2-amino-4-tert-butylphenol, 2-tertbutyl-4-methylphenol, 4-tert-butyl-2-methylphenol, 4-tert-butylphenol, 2-amino-5-nitrophenol, 5-isopropyl-3-methylphenol, 4-(methylamino)phenol sulfate, 3-methoxyphenol, 3,5-dimethylthiophenol, 3,5-dimethylphenol, 2-aminophenol, 4-aminophenol, 3-(N,N'-diethylamino)-phenol, 2,6-dimethoxyphenol, 4-acetaminophenol, 2-amino-4-methylphenol, 2,5-dimethylphenol, 2-ethylphenol, 4-ethylphenol, and a mixture thereof.

5. The nanocomposite of claim 1, wherein the nonmodified clay is smectite-based clay.

6. The nanocomposite of claim 5, wherein the smectite-based clay comprises at least one material selected from the group consisting of montmorillonite, bentonite, saponite, beidellite, nontronite, hectorite, and stevensite.

7. The nanocomposite of claim 1, wherein a number-average molecular weight of the sulfonated polysulfone is 10,000-300,000 and a weight-average molecular weight of the sulfonated polysulfone is 20,000-500,000.

8. A method of manufacturing the nanocomposite of claim 1, comprising mixing the nonmodified clay, a first polymerized monomer for forming the sulfonated polysulfone, a second polymerized monomer for forming the sulfonated polysulfone, and a diol compound to perform a polymerization reaction after a heat treatment.

9. The method of claim 8, wherein the sulfonated polysulfone is represented by formula 2 below:

[Formula 2]

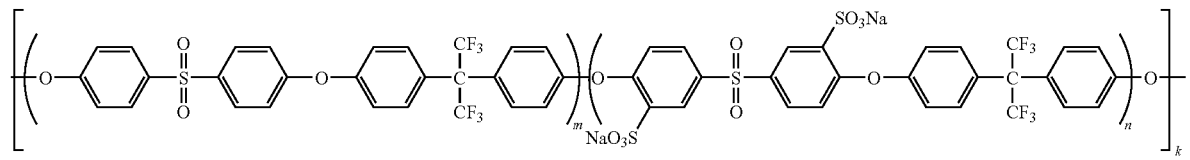

where, m is 0.1-4, n is 0.1-4, and k is 5-500.

10. The method of claim 8, further comprising:
removing water generated under reflux at a polymerization temperature of 100-160° C.; and
performing a polymerization reaction after heating at a temperature of 140-195° C.

11. The method of claim 8, further comprising
adding a clay modifier to the mixture of the nonmodified clay, the first polymerized monomer for forming the sulfonated polysulfone, and the second polymerized monomer for forming the sulfonated polysulfone.

12. A method of manufacturing a nanocomposite of claim 1, comprising:
mixing a first polymerized monomer for forming the sulfonated polysulfone, a second polymerized monomer for forming the sulfonated polysulfone, and a diol compound to perform a condensation polymerization reaction after heat treatment; and
adding the nonmodified clay to the resultant obtained from the condensation polymerization reaction and mixing.

13. The method of claim 12, wherein the sulfonated polysulfone is represented by formula 2 below:

[Formula 2]

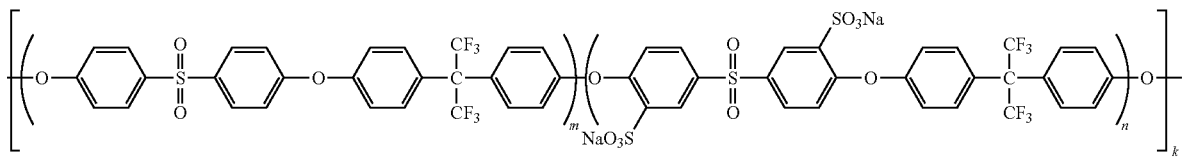

where, m is 0.1-4, n is 0.1-4, and k is 5-500.

14. The method of claim 12, further comprising:
adding a clay modifier to the resultant obtained from the condensation polymerization reaction, prior to adding the nonmodified clay.

15. The method of claim 12, further comprising:
removing water generated under reflux at a polymerization temperature of 100-160° C.; and
performing a polymerization reaction after heating at a temperature of 140-195° C.

16. The method of claim 12, wherein the first polymerized monomer is a halide compound as represented by Formula 3 below:

[Formula 3]

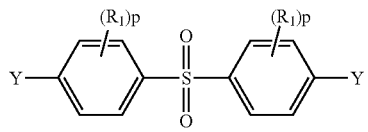

where, $R_1$ and p are defined as in Formula 1 and Y is Cl, F, Br, or I.

17. The method of claim 12, wherein the second polymerized monomer is a halide compound as represented by Formula 4 below:

[Formula 4]

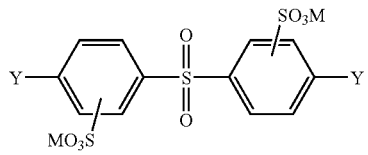

where, M is defined as in Formula 1 and Y is Cl, F, Br, or I.

18. The method of claim 12, wherein the diol compound is represented by Formula 5 below:

[Formula 5]

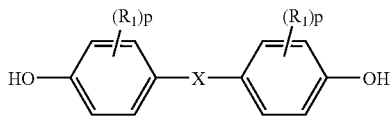

where, $R_1$, X and p are defined as in Formula 1.

19. A nanocomposite electrolyte membrane comprising the nanocomposite of claim 1.

20. A fuel cell comprising:
a cathode;
an anode; and
an electrolyte membrane interposed between the cathode and the anode, the electrolyte membrane being a nanocomposite electrolyte membrane including the nanocomposite of claim 1.

21. The fuel cell of claim 20, wherein the the sulfonated polysulfone of the nanocomposite is represented by formula 2 below:

[Formula 2]

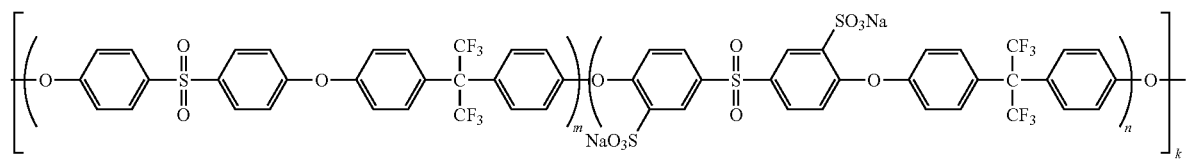

where, m is 0.1-4, n is 0.1-4, and k is 5-500.

\* \* \* \* \*

UNITED STATES PATENT AND TRADEMARK OFFICE
CERTIFICATE OF CORRECTION

PATENT NO. : 7,652,089 B2 Page 1 of 1
APPLICATION NO. : 11/445334
DATED : January 26, 2010
INVENTOR(S) : Yeong-suk Choi et al.

It is certified that error appears in the above-identified patent and that said Letters Patent is hereby corrected as shown below:

Title Page, Item (54), Title, after "FUEL" insert --CELL--.

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,652,089 B2  Page 1 of 1
APPLICATION NO. : 11/445334
DATED : January 26, 2010
INVENTOR(S) : Yeong-suk Choi et al.

It is certified that error appears in the above-identified patent and that said Letters Patent is hereby corrected as shown below:

Title Page, Item (54) and at Column 1, line 2, Title, after "FUEL" insert --CELL--.

This certificate supersedes the Certificate of Correction issued May 4, 2010.

Signed and Sealed this

First Day of June, 2010

David J. Kappos
*Director of the United States Patent and Trademark Office*